United States Patent [19]

Higuchi et al.

[11] Patent Number: 4,809,267
[45] Date of Patent: Feb. 28, 1989

[54] PACKET DATA COMMUNICATION SYSTEM WITH RING TYPE TRANSMISSION LINE

[75] Inventors: Masahiro Higuchi, Kawasaki; Haruki Fukuda, Tokyo; Kenshi Tazaki, Kashiwa; Masahiro Matsuda; Tomohiko Awazu, both of Kawasaki, all of Japan

[73] Assignee: Fujitsu Limited, Kawasaki, Japan

[21] Appl. No.: 67,231

[22] Filed: Jun. 29, 1987

[30] Foreign Application Priority Data

Jun. 27, 1986 [JP] Japan ................................. 61-150775
Sep. 12, 1986 [JP] Japan ................................. 61-216468
Jan. 7, 1987 [JP] Japan ................................. 62-001412

[51] Int. Cl.⁴ .............................................. H04J 3/02
[52] U.S. Cl. .................................. 370/86; 340/825.5; 340/825.06
[58] Field of Search ....................... 370/86, 88, 85, 89, 370/95; 340/825.05, 825.06, 825.51

[56] References Cited

U.S. PATENT DOCUMENTS 4,574,375 3/1986 Kemp et al. .......................... 370/85
4,593,280 6/1986 Grow .................................... 370/69
4,623,886 11/1986 Livington ............................. 370/85

Primary Examiner—Robert L. Griffin
Assistant Examiner—Wellington Chin
Attorney, Agent, or Firm—Staas & Halsey

[57] ABSTRACT

A packet data communication system with a ring-type transmission line circulates a predetermined number of slots in which packets to be transmitted are loaded. The system includes interface nodes, provided on the ring-type transmission line, for loading packets on slots and receiving packets from slots for terminals connected thereto. In each interface node, there are a predetermined number of sub-transmission lines, for passing each of slots in parallel through the interface node, terminal interfaces each having a plurality of sending buffers for storing packets and a plurality of receiving buffers for storing packets, and a switch for connecting each of the sending buffers and receiving buffers to any one of the sub-transmission lines.

16 Claims, 14 Drawing Sheets

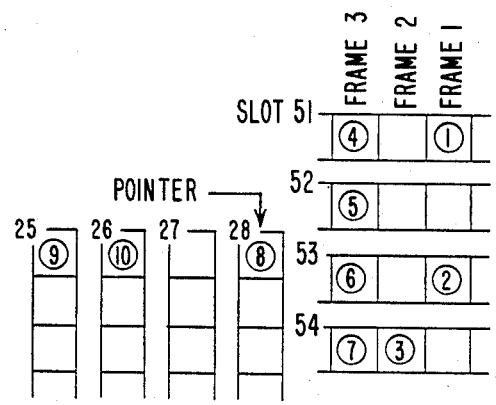
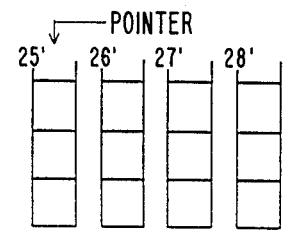
FIG. 10(D)
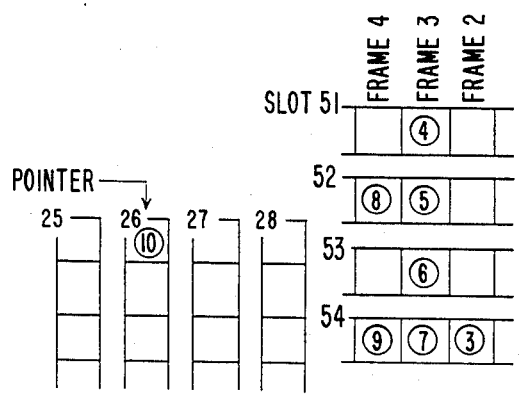
FIG. 10(E)
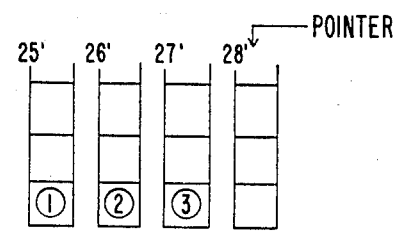
FIG. 10(F)

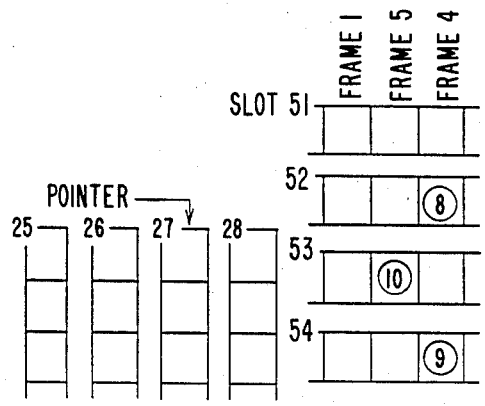
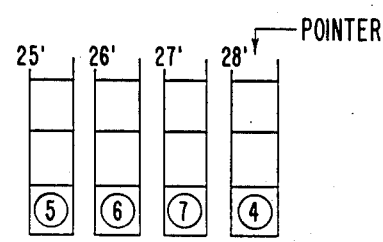
FIG. 10(G)
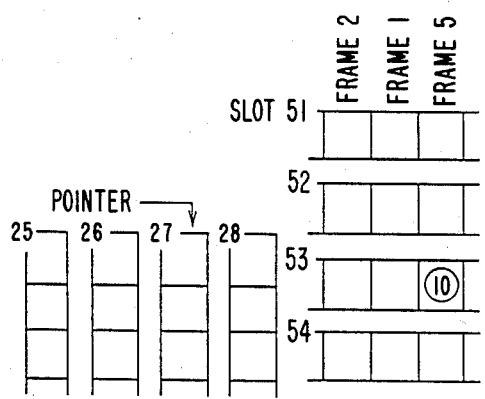
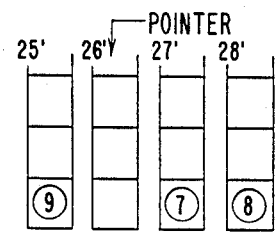
FIG. 10(H)
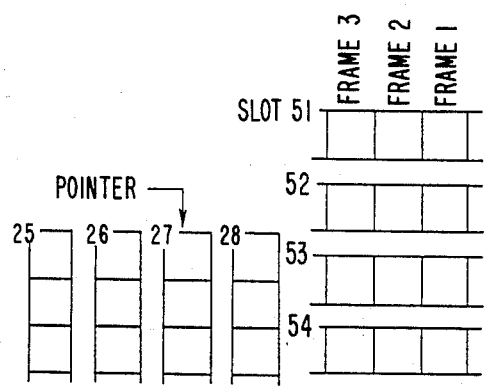
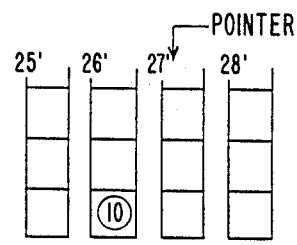
FIG. 10(I)

PACKET DATA COMMUNICATION SYSTEM WITH RING TYPE TRANSMISSION LINE

BACKGROUND OF THE INVENTION

The present invention relates to a packet data communication system with a ring type transmission line represented by a local area network (LAN) and, more particularly, to a high speed, large capacity packet data communication system for efficiently transmitting various data such as multiplexed voice, moving images and burst data, etc.

Advancement of hardware/software in the field of information processing field is notable in recent years. With improvement in the processing capability of computers and microprocessors, high performance and spreading of communication terminals and work stations, large capacity files such as optical disk and distribution of processing with development of distributed databases, a network is established between these types of hardware and the amount of data handled by such networks is increasing.

In addition, improvements in function of image processing hardware/software and the advent of TV conference systems requires a network which can handle unified high speed and large capacity image information in addition to the existing voice and data.

FIG. 1 is an example of structure of the said network (local area network). As the trunk network, a ring type transmission line 1 is employed. In the course of the ring type transmission line 1, a plurality of interface nodes 2 are provided and each interface node accommodates various systems. Namely, this is a bus-type local area network for communication between a plurality of workstations 5, digital PABX 6, telephone sets and facsimiles connected and controlled by the digital PABX 6, remote unit 7 which accommodates data terminals, low speed ring type local area network 8, communication control apparatus 11 of main frame computer 12 and adapter 10 which accommodates its TSS terminals, TV conference system 13 and composite multiplexing apparatus 9 for connection with a high speed leased digital line. Each system is respectively connected to the high speed ring type network 1 through an interface node 2 and the system-to-system communication can be made through the control of such interface node 2. In addition, the high speed ring type network 1 is supervised by the supervisor node 3. As an access method to such ring type network 1, a slot ring system is proposed. In this slot ring system, a plurality of fixed length slots are circulating on the network 1, each interface node 2 detects an available slot, the data from the terminal(s) accommodated by that node 2 is loaded to the detected available slot after it is converted to packet data and then such packet data is sent to the other interface nodes 2.

As a method of realizing a high speed and large capacity network, it is possible to increase the transmission rate of each packet or to transmit in parallel a plurality of packets without changing the transmission rate of packets. High speed operation of LANs has been realized almost by the former method because it is estimated that the number of gates of control circuits increases if the latter method is employed. Accordingly, little investigation has been made into the latter method.

However, when considering realization of LAN having a transmission capacity in the order of several hundred Mb/s, problems for realization, such as high power consumption of ECL circuits and "difficulty in handling" during debug/maintenance, are generated in the method of increasing the transmission rate of each packet. As an effective method for avoiding such problems, consideration is given to employ the parallel communication system where high speed and large capacity transmission is realized by transmitting in parallel a plurality of packets and each packet is processed by a low speed TTL circuit.

SUMMARY OF THE INVENTION

It is therefore an object of the present invention to provide a practical structure for realizing a packet communication system utilizing a parallel communication system.

It is another object of the present invention to provide a control method to efficiently transmit a plurality of packets and receive a plurality of packets from a plurality of transmission lines in the packet communication system utilizing the aforementioned parallel communication system.

It is a further object of the present invention to eliminate overhead time of communication generated by composite handling of data with different characteristics such as voice and to burst data and provide a control method for elimination in the packet communication system utilizing the aforementioned parallel communication system.

The above objects are attained by providing a packet data communication system, comprising a ring-type transmission line for circulating frames, each frame including a frame header and a predetermined number of slots in which packets to be transmitted are loaded. A plurality of interface nodes are provided on the ring-type transmission line for loading the packets in the slots and for receiving the packets from the slots. Each of the interface nodes includes a predetermined number of sub-transmission lines for passing the slots in one of the frames in parallel through said interface node and terminal interfaces, each terminal interface having a plurality of sending buffers for storing the packets to be transmitted and a plurality of receiving buffers for storing the packets to be received. The interface nodes also include packet processing means for detecting whether the slots on each of the sub-transmission lines are available and for detecting the addresses of the packets in the slots, synchronization means for synchronizing the frames using the frame header and for generating a plurality of timing signals to the packet processing means and switch means, controlled by the packet processing means, for connecting each of the sending buffers and the receiving buffers to any one of the sub-transmission lines.

BRIEF DESCRIPTION OF THE DRAWINGS

FIGS. 10(A)~(I) show the process of connecting sending/receiving buffers to sub-transmission lines.

Through the above-listed figures, the same numerals and symbols indicate same parts, and the signal lines having the symbol "-/-" show that there actually exist a plurality of signal lines.

DESCRIPTION OF THE PREFERRED EMBODIMENTS

Figure 2:
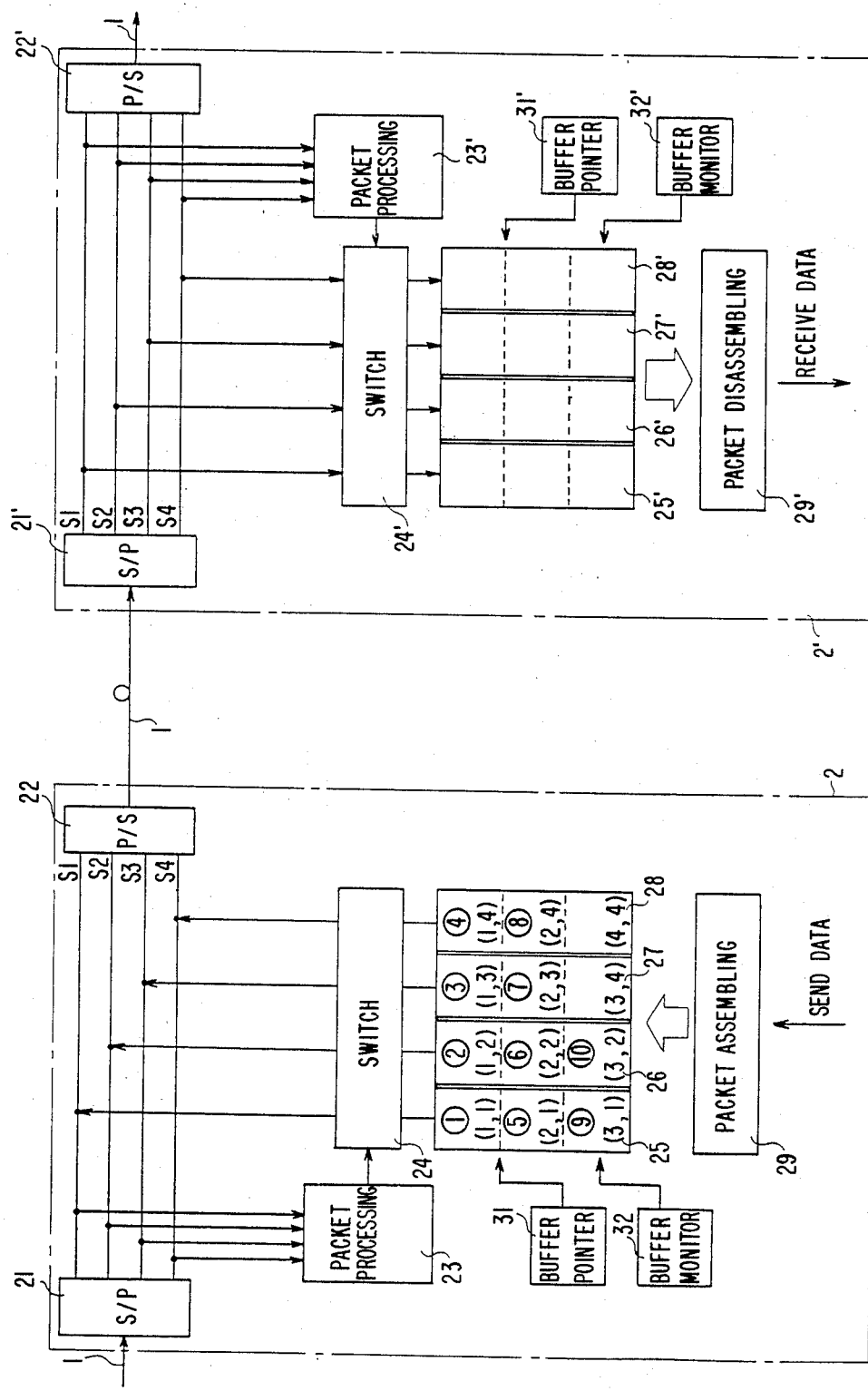
FIG. 2 shows a principle block diagram of this invention.

FIG. 2 is a principle block diagram wherein the ring-type transmission line 1 is formed by a plurality of sub-transmission lines S1, S2, S3, S4 in the interface nodes, each of lines S1–S4 having the same transmission delay time. In FIG. 2, the parallel transmitting of packets is carried out by four sub-transmission lines S1, S2, S3, S4. The transmission line 1 corresponding to the main transmission line 1 is formed by a single line of optical fiber. Therefore, the interface nodes 2, 2' are provided with series/parallel conversion circuits 21, 21' and parallel/series conversion circuits 22, 22' at the input and output sides respectively of the sub-transmission lines S1–S4. Four bit-interleaved packets on the transmission line 1 are disassembled into respective packets in the circuits 21, 21' and the disassembled bits are multiplexed in the circuits 22, 22'. Therefore, the interface nodes 2, 2' operate as if four sub-transmission lines S1, S2, S3, S4 were existing independently.

A packet assembling circuit 29 stores the sequence of the send data stream (SEND DATA) by assembling the send data stream flowing into the interface node 2 from the device(s) attached thereto into the packets. Send buffers 24–28 accommodate the assembled plural packets having a sequence determined in the packet circuit 29. A switch 24 stores the sequence of the packets in the send buffers 25, 26, 27, 28 and transmits the packets to the transmission lines S1 to S4 in accordance with the condition of the sub-transmission lines S1, S2, S3, S4. Packet processing circuits 23, 23' detect the condition of packets on the sub-transmission lines S1~S4 and controls the switches 24, 24', respectively. The switch 24 stores the sequence of packets on the sub-transmission lines S1~S4 and transmits the packets to receive buffers 25', 26', 27', 28' in the same sequence as the accommodation sequence on the send buffers 25~28. A packet disassembling circuit 29 reproduces the send data stream (SEND DATA) in the sequence in the receive buffers 25'~28'.

In FIG. 2, the input send data stream (SEND DATA) is assembled to a plurality of packets in the packet assembling circuit 29 and each packet is accommodated in the send buffers 25~28 in such a manner that the sequence of the send data stream is retained. The sequence in the send buffers 25~28 is stored by the switching operation of the switch 24 under the control of packet processing circuit 23 and the packets are sent to the sub-transmission lines S1~S4. The packet processing circuit 23' accommodates the packets in the receive buffers 25'~28' in the same accommodation sequence as the send buffers 25~28, using the sequence on the sub-transmission lines S1~S4. The packet disassembling circuit 29' reconstructs the send data stream in the sequence in the receive buffers 25'~28'.

Here, the data format on the transmission line 1 is explained with reference to FIG. 3.

Figure 3:
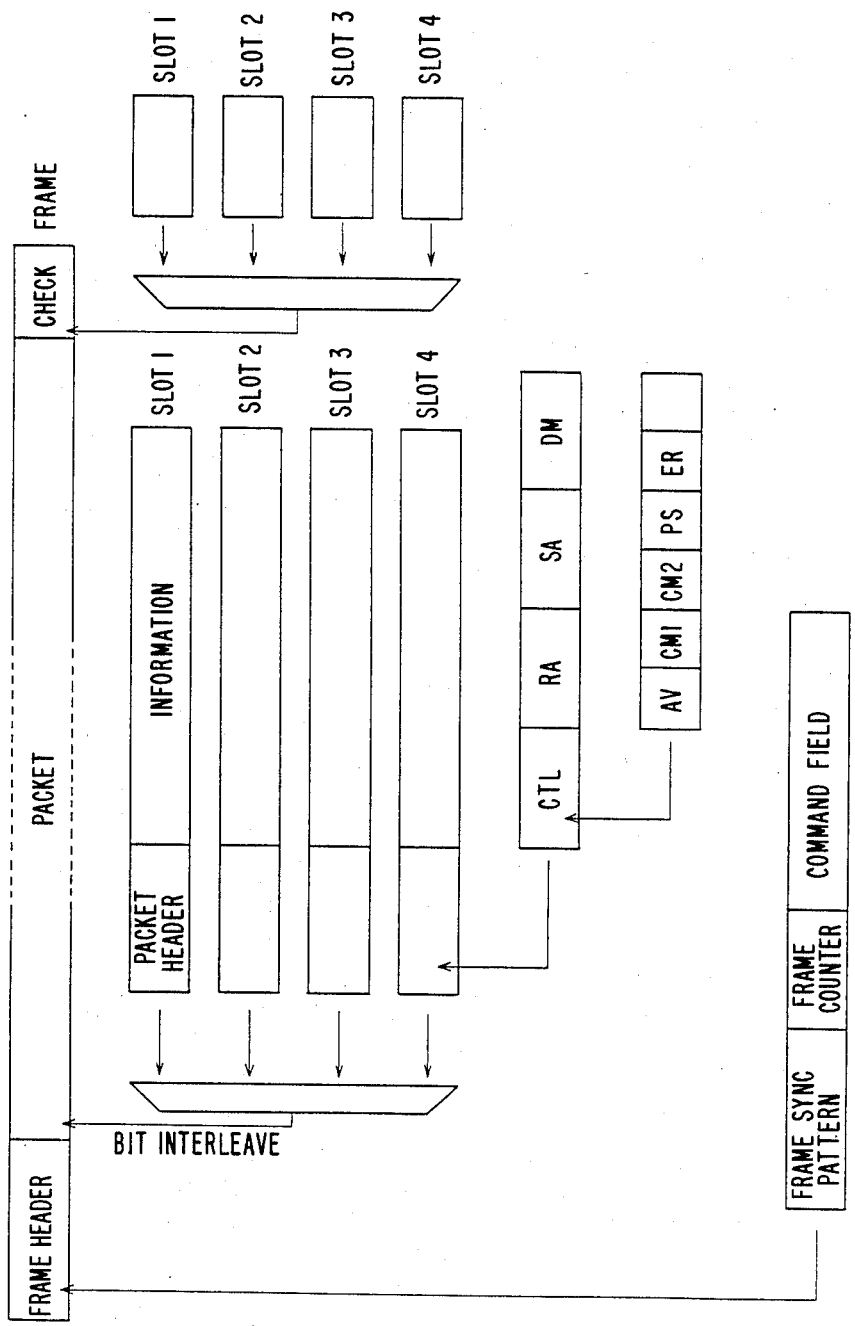
FIG. 3 shows a frame format on the ring-type transmission line.

In the above-mentioned system, as indicated in FIG. 3, a plurality of frames consisting of four slots SLOT1, SLOT2, SLOT3, SLOT4 (accommodating packets) which are multiplexed in parallel by bit interleave are circulated in trank 1. In this case, at least four buffers are required for sending and receiving sides so that four slots being transmitted in parallel can be accessed simultaneously. The packets stored in the send buffer are loaded in the slots SLOT1–SLOT4.

Here, ① the sequential relationship between packets in the send buffers 25~28, ② sequential relationship between packets on the transmission lines S1~S5 and ③ the sequential relationship between packets in the receive buffers 25'~28' are defined as indicated below.

[Sequential relationship of packets in the send and receive buffers]

In case n send and receive buffers exist, a linear sequence number, 1, 2, . . . , n, is given to the n buffers forming a packet group. If the h-th packet accommodated in the buffer g accommodating a packet group is expressed as (g, h), the sequential relationship between different two packets (g, h) and (i, j) becomes (1) (g, h)<(i, j) when g<i under the condition that h=j or when h<j and (2) (g, h)>(i, j) when g>i under the condition that h=j or when h>j.

Namely, a lower numbered "row (horizontal)" is superior between packets of send and receive buffers and a lower numbered "column (vertical)" is superior when the "row" is the same. This means that the packet having the lower "row" and "column" numbers for accommodation into the receive buffer is transmitted because its transmission sequence is considered minimum.

[Sequential relationship between packets on the transmission lines]

In case m slots to be transmitted on the sub-transmission lines in parallel exist, the linear sequence numbers 1, 2, . . . , n are given to such slots (SLOT1, . . . , SLOT4 . . . , SLOTm as indicated in FIG. 3. If the packet in the i-th slot of the frame passing the interface node at the time t is expressed as (i, t), the sequence between two different packets (i, t$_1$) and (j, t$_2$) becomes (1) (i, t$_1$)<(j, t$_2$) when i<j under the condition that t$_1$=t$_2$ or when t$_1$<t$_2$; or (2) (i, t$_1$)>(j, t$_2$) when i=j under the condition that t$_1$>t$_2$ or when t$_1$>t$_2$.

Namely, when the passing time is different, the frame with the earlier passing time is superior and when the passing time of frame is the same, the packet of slot having the lower number is superior. This means that the slots with lower numbers and earlier frames are first to receive packets from the send buffers 25–28 and the earlier frames and lower numbered slots are accommodated into the receive buffer 25'-28' first.

Next, operations are explained along the transmission process indicated in FIGS. 10A~I with reference to FIG. 2. Here, estimated is an example where 10 packet messages ①, ②, ③, ④, ⑤, ⑥, ⑦, ⑧, ⑨, ⑩ are transmitted in parallel on four sub-transmission lines. As an example, the packet assembling circuit 29 partitions the send data stream into packets of fixed length and each buffer 25–28 is accessed by sending the packet one by one to the buffers 25, 26, 27, 28, 25, 26, . . . . The packets may be transmitted on trunk 1 in any sequence if proper matching is established between the packet assembling circuit 29 and the packet disassembling circuit 29'.

Transmission process 1 (FIG. 10A):

The packet messages ①, ②, ③ are sequentially accommodated in the send buffers 25, 26, 27. In this case, the send buffer pointer 30 which indicates the buffer storing the packet to be transmitted next indicates the send buffer 25. Nothing is yet transmitted to the sub-transmission lines S1~S4. The receive buffer pointer 31 indicates the receive buffer 25'. The successive packets ④, ⑤, ⑥, ⑦, ⑧, ⑨, ⑩ are sequentially accommodated later.

Transmission process 2 (FIG. 10B):

The packet processing circuit 23 detects that the slot 51 of frame 1 and the slot 53 of frame 1 are empty. In case there are three packets waiting for transmission by the buffer monitor 32 and the send buffer pointer 31 indicates the buffer 25, the switch 24 connects the send buffer 25 to the slot 51 and the send buffer 26 to the slot 53. Thereby, the slot 52 of frame 1 and slot 54 of frame 1 pass through. Thereby, the stored packets ①, ② are transmitted by giving the readout signal to the send buffers 25 and 26. The send buffer pointer 31 indicates the buffer 27. Therefore, the packet of the minimum "row" and "column" is extracted with the first priority and it is then transmitted to the lowest numbered available slot. The send buffers 25 and 26 thereafter accommodate respectively the successive packets ⑤ and ⑥ in place of ① and ②.

Such operations are also carried out in the transmission process 3 (FIG. 10C) and 4 (FIG. 10D).

Transmission process 5 (FIG. 10E):

The packets sent to the sub-transmission lines S1~S4 as explained previously are then accommodated in the receive buffers 25'~28' from the sub-transmission lines S1~S4. Namely, the packet processing circuit 23' detects that the packets ① and ② of the frame 1 match the local interface node address and the packets ① and ② are respectively accommodated in the receive buffers 25' and 26' since the receiver buffer pointer 31' indicates the receive buffer 25' (FIG. 10D). In this case, the switch 24' switches the slot 51 of frame 1 to the buffer 25' and the slot 53 of frame 1 to the buffer 26' and sets the receive buffer pointer 31' to indicate the receive buffer 27' by giving the write signal to the receive buffers 25', 26'. Therefore, as explained previously, the packets having lower sequence numbers among those in the earliest packets are sequentially accommodated in the sequence of receive buffers 25'-28'.

Such operations are also carried out in the transmission processes 6~9 (FIGS. 10F~I). Thereby, packet sending and receiving come to the end.

The practical structures of interface nodes 2, 2' and supervisor node 3 are explained with reference to FIG. 3 and FIG. 4.

The frame structure of FIG. 3 is first explained in detail.

The packet consisting of header part and information part is loaded to the slots SLOT1~SLOT4 corresponding to a plurality of sub-transmission lines S1~S4. Each packet is multiplexed by bit interleave and is loaded to the packet part in the frame of transmission line 1. The frame header is added to the heading part of the frame. This frame header is provided with a frame synchronization pattern for deciding each bit position in the frame, a frame counter which is intrinsic to one frame (discriminated from other frames circulating on the same transmission line) and a region for loading the command transmitted between the interface node and the supervisoring node for reserving the slots for the synchronizing communication, or sent from the console connected to the supervisor node 3 at the time of initial start of system or during a test. Meanwhile, the heading part of packet is provided with the packet header being divided into four fields of control field CTL, receive address field RA, send address SA and data administration field DM. Moreover, the control field CTL is composed of the packet valid/invalid indication flag AV, reserved/not-reserved indication flag CM1, the flag CM2 which indicates that the data in the information part is the burst information, the flag PS which indicates that the packet is not received because the terminal interface 40 is busy and the flag ER which designated whether the flag AV is deleted by the send node or receive node. Moreover, the trailing part of the packets have check bits for detecting and correcting errors. Such check bits are provided at the trailing part of each frame as in the case of each packet. The function of packet header will be explained later.

Figure 4:
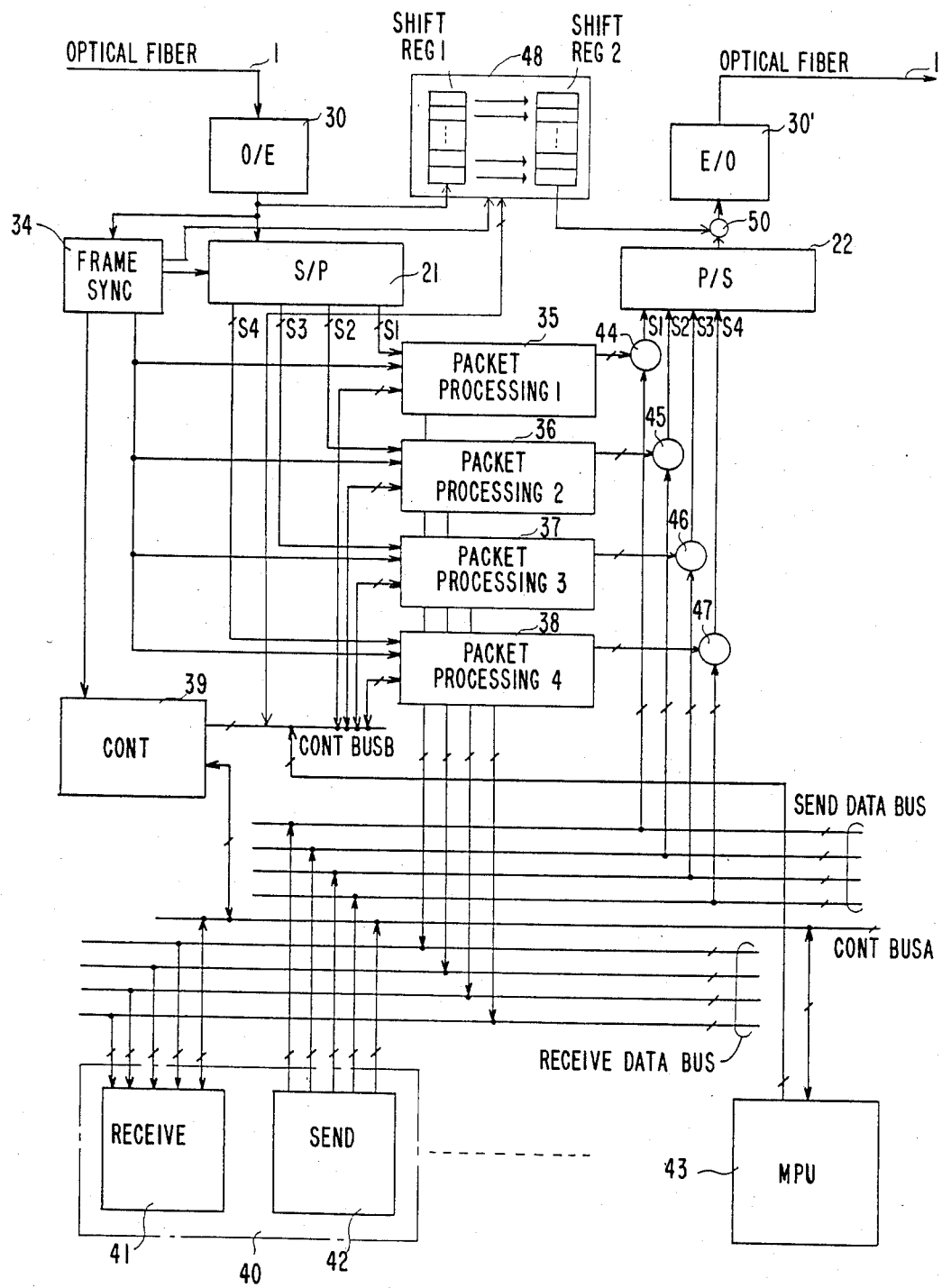
FIG. 4 shows a block diagram of an interface node.

FIG. 4 is a block diagram of the internal structure of the interface nodes 2, 2' and supervisor node 3.

Figure 1:
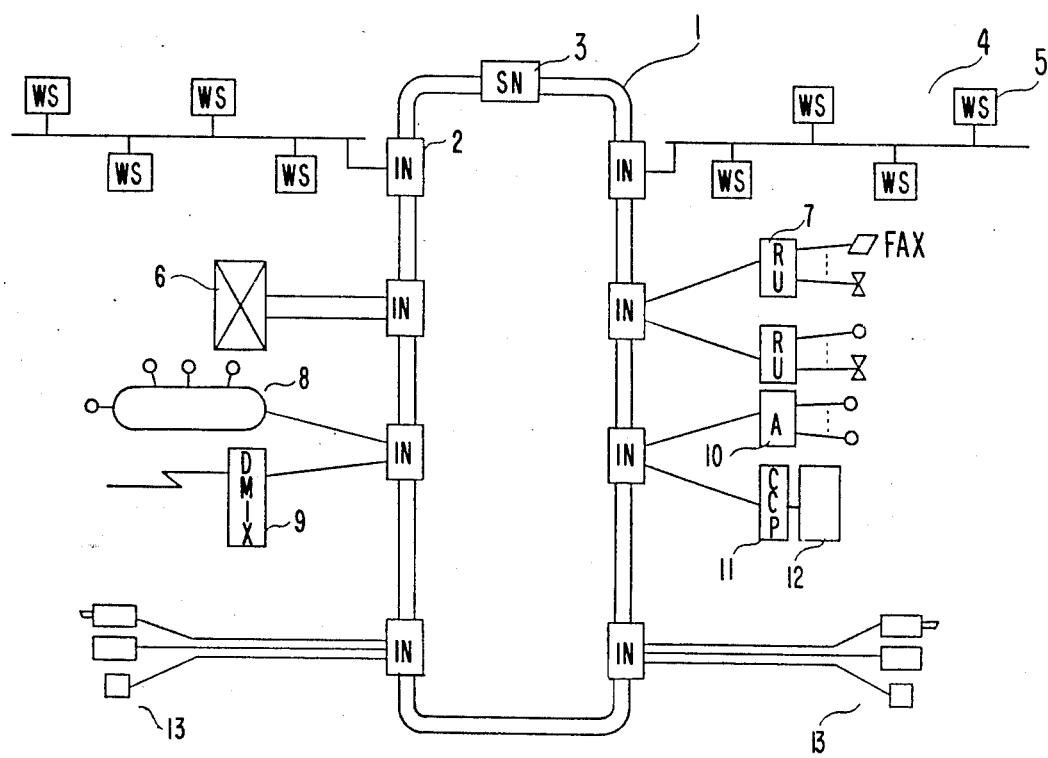
FIG. 1 shows a structure of the Local Area Network.

The optical fiber 1 corresponds to the main transmission line 1 in FIG. 1 and a frame having the structure consisting of a plurality of slots SLOT1~SLOT4 indicated in FIG. 3 circulates therein. The photoelectric converter 30 converts the received optical signal into an electric signal and then inputs the received signal, after waveform shaping, to a frame synchronizing circuit 34 and serial/parallel conversion circuit 21. A frame synchronizing circuit 34 detects the frame synchronizing pattern added to the heading part of each frame for frame synchronization and outputs various timing signals for deciding bit positions in the frame to packet processing circuits 35, 36, 37, 38, control circuit 39 and serial/parallel converting circuit 21. The serial/parallel converting circuit 21 is driven by the clock signal synchronized with the frame on the transmission line 1 input from the frame synchronizing circuit 34 and outputs the parallel signal of 4 bits. This parallel signal is the packet loaded in each slot SLOT1~SLOT4 in FIG. 3.

The packet processing circuits 35~38 analyze the packet header on the basis of the timing signal from the frame synchronizing circuit 34. The results of analysis of packet processing circuits 35~38 are sent to the control part 39 through CONT BUSB. The control part 39 changes the switches 44~47 based on the result of analysis and thereby sends the packets stored in the send buffers 25~28 (existing in the send interface 42) within the terminal interface 40 to the parallel/serial converting circuit 33 through the send data bus and then executes the control for sending it to the transmission line 1 and subsequently to store the received packets in the receive buffers 25'~28' (existing in the receive interface 41) through the receive data bus. These controls are executed by the control signal transmitted through the CONT BUSA. The terminal interface 40 is provided with the send interface 42 consisting of the switch 24, send buffers 25~28 and packet assembling circuit 29 indicated in FIG. 1 and the receive interface 41 consisting of the switch 24', receive buffers 25'~28' and packet disassembling circuit 29'. FIG. 4 indicates only one unit of terminal interface 40 but a plurality of units may be connected at a single interface node 2.

The control part 39 decides the transmission mode (synchronous continuous communication or burst communication) depending on the send request from the terminal connected to the terminal interface 40. When the synchronous continuous communication is decided, a necessary number of slots are reserved, in accordance with the amount of information, to the supervisor node 3 using the packet header indicated in FIG. 3 by controlling the packet processing circuits 35~38.

Here, since the phase of parallel slots is the same in the frame structure indicated in FIG. 3, the packet headers reach the packet processing circuits simultaneously. Therefore, the same number of packet processing circuits as parallel slots must be provided.

Figure 11:
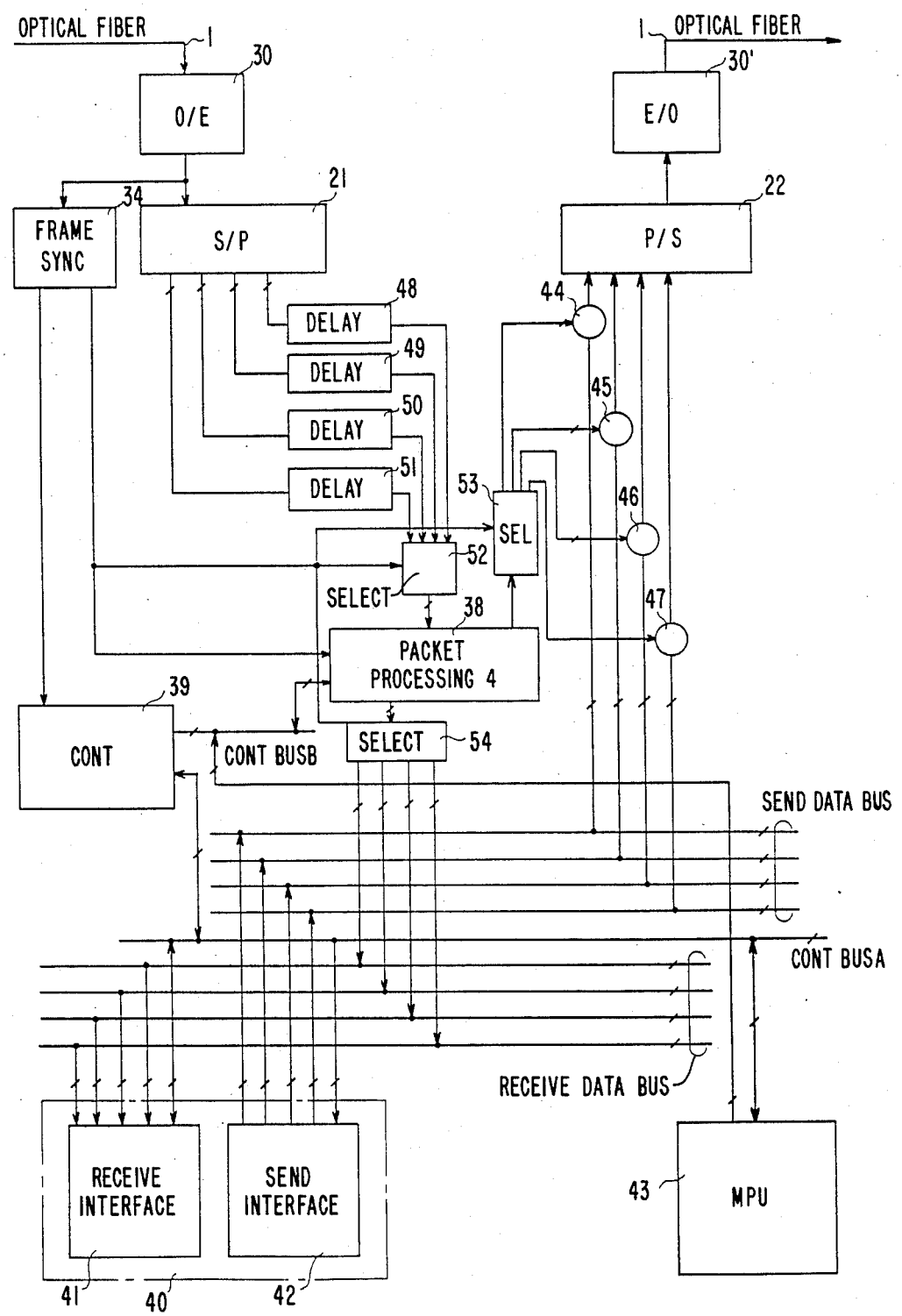
FIG. 11 shows another structure of an interface node.
Figure 12:
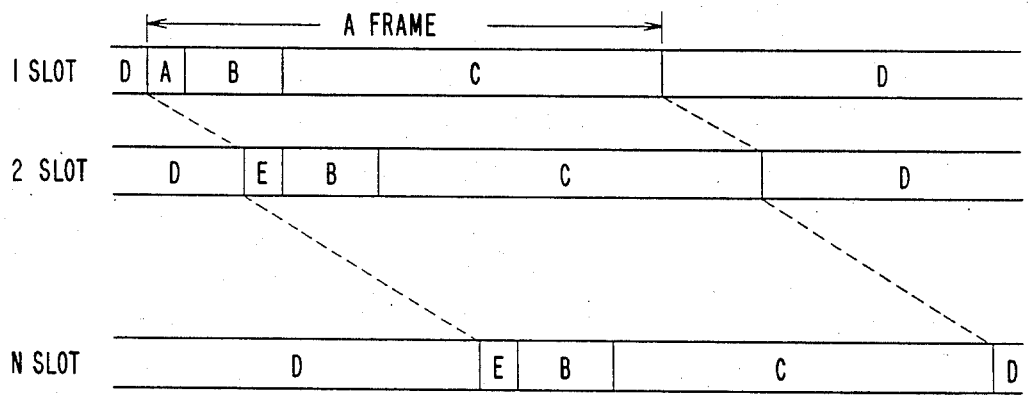
FIG. 12 shows another frame format of this invention.

In this case, such frame structure that the phases of slots transferred in bit multiplex to the ring-type network are deviated for a specified amount as indicated in FIG. 2. The E of #2 slot~#N slot indicates the dummy region in the same length as the frame header for time difference adjustment and the frame header is not provided up to the #2~#N slots. The structure of FIG. 4 is therefore changed into FIG. 11 and outputs S1~S4 of the serial/parallel converting circuit 21 are respectively input to the selector 52 through the delay circuits 48~51. Since the frame synchronizing circuit 34 is capable of detecting the packet header of each packet, the packet header detection signal sent from the frame synchronizing circuit 34 is input to the selector 52 and only one of the outputs S1~S4 is input to the packet processing circuit 38 on a time division basis.

The output to the receive data bus from the packet processing circuit 38 is also provided through the selector 54 on a time division basis. The output to a switches 44~47 can also be provided by the selector 53 on the time division basis. The switch timing signals of selectors 52~54 can be generated in the frame synchronizing circuit 34. With such structure, only one packet processing circuit is necessary and therby the amount of hardware can be reduced.

The delay circuits 48~51 are provided for queuing the delay in operation of the packet processing circuit. As described previously, the packet communication system with ring-type transmission line of the present invention is required to flexibly cope with both communication (synchronous continuous communication) which is required to have periodicity in data transfer like image communication or voice communication and communication (burst communication) which is not required to guarantee the periodicity of data transfer, like the data communication between computers, but is required to minimize the transmission delay as much as possible, coexist and make communication mode changes dynamically.

However, the slot ring system, where the empty slots (available slots) among the slots defined by dividing the frame circulated through the ring-type transmission line for the specified length are seized for data transmission between the terminals connected to the ring-type transmission line by loading the packets to such slots, must inevitably wait temporarily for transmission of data. If many data transmission requests for use of empty slots are generated at one time, there will be a shortage of empty slots. Under such condition, the synchronous continuous communication which is restricted in the transfer periodically will result in serious interference such as data overflow or data underflow, etc.

In general, therefore, as a means for eliminating such disadvantage, the packets which are circulated through the loop type transmission line are sorted into a couple of kinds. One is packets for synchronous continuous communication and the other is packets for burst communication. For the former kind of packets, a number of communications is always set to a value less than the number of packets and the system design is defined considering that packets can be used any time desired for communication.

However, this system provides a problem in that flexibility is insufficient because the ratio between the synchronous continuous communication and burst communication is fixed an flexible measures for the system where the communication mode changes dynamically is difficult.

Therefore, the packet communication system of the present invention assigns the packet numbers to the packets by providing a reserved information part to a specified region in each packet. Moreover, the particular supervisor node 3 supervises assignment of reserved packets, notification of packet numbers and reserved assignment condition of packets, while ordinary interface node 2 reserves the packets having the numbers assigned to the local interface node and executes the packet send when the empty reserved packet arrives after reservation.

Namely, the packet management by the supervisor node 3 in this embodiment includes reservation of packets when required, so long as the sum of the number of packets being used (reserved) and to be used does not exceed the total number of packets. Thereby, this packet management assures flexible measures for the communication system where the synchronous continuous communication and burst communication coexist.

In view of explaining in detail the procedures for data transmission and reception, the structure of each part of FIG. 4 will be explained in detail. Send interface 42 (FIG. 5):

As explained previously, the interface node 2 is provided with a plurality of terminal interfaces 40 and each terminal interface is connected with terminals in different communication modes. Accordingly, prior to transmission, the terminal sets the signal which indicates the transmission mode (synchronous continuous communication or burst communication) to a register 61 in the send interface 42. Simultaneously, in case the send mode is synchronous continuous communication, the terminal also sets the receive terminal address and amount of send data to the register 61. Upon setting the send request to the register 61, the terminal sends the send data and receive address to the packet assembling circuit 29. The packet assembling circuit 29 adds the header part and check bit to the send data and assembles the packet with the specified length as indicated in FIG. 3. In this case, the receive address is set to the field RA in the packet header, while the local interface node address to which the packet and the address of the terminal are set to the field SA. Each flag of the CTL field is controlled by the packet processing circuits 35~38.

The packets are sequentially assembled in the sequence of the input data stream in the packet assembling circuit 29 and are sequentially stored in the send buffers 25, 26, 27, 28, 25, . . . 26, 27, 28, in accordance with the sequential relationship definition of packets.

Figure 5:
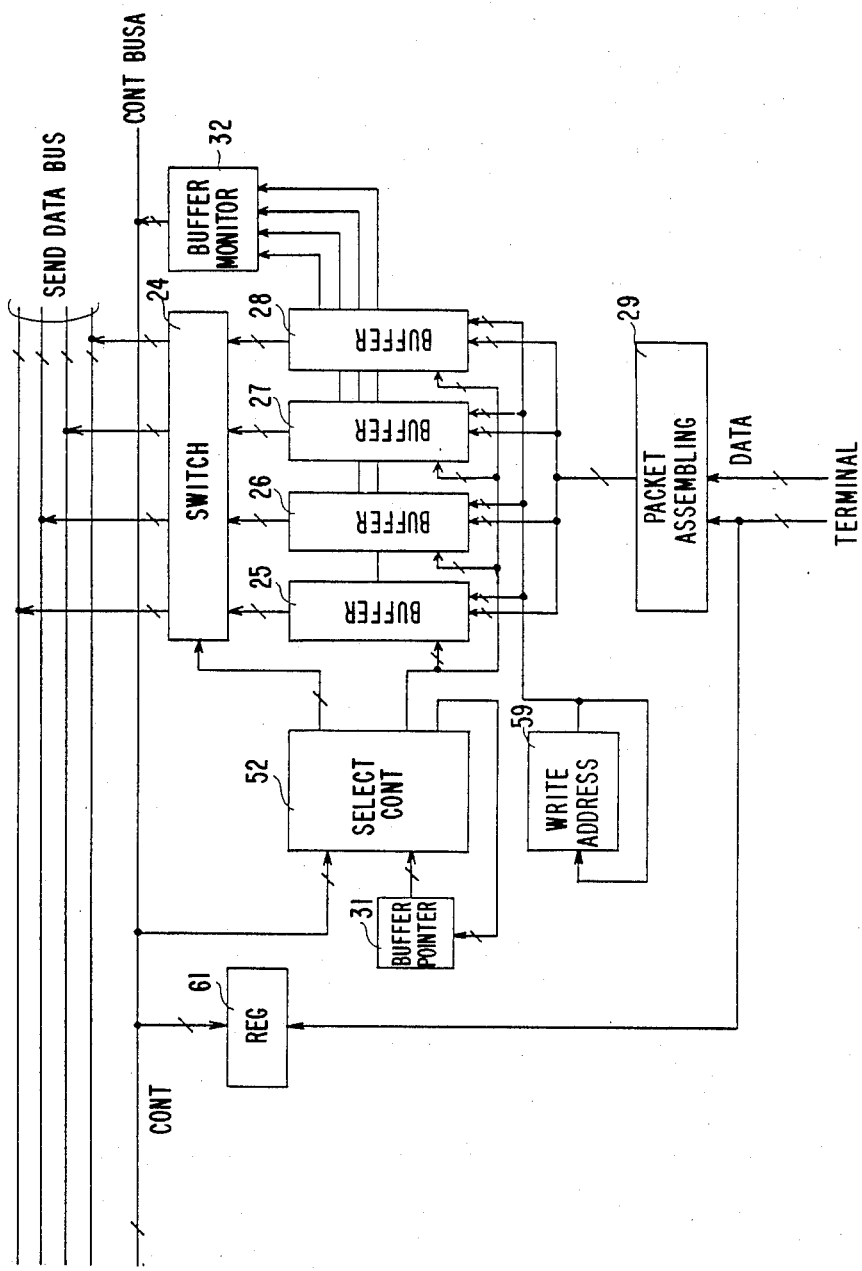
FIG. 5 shows a block diagram of a send interface.
Figure 6:
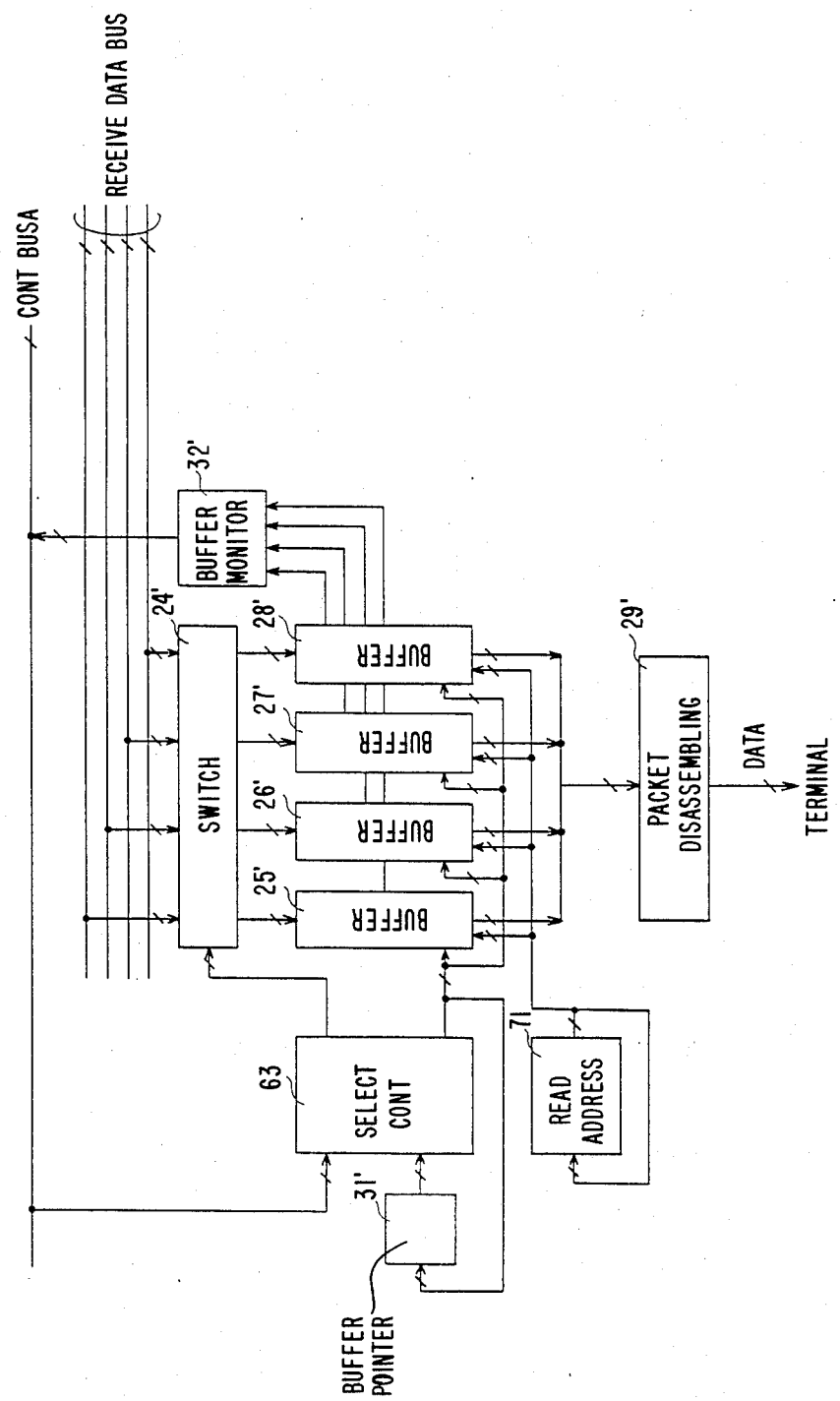
FIG. 6 shows a block diagram of a receive interface.

In this case, the address of buffer for storing is designated by sequentially counting up in the write address counter 59. The send buffers 25~28 temporarily store the packets to be input from the packet assembling circuit 29 and the output side of buffers 25∞28 can be connected with any send data bus through the switch 24. The buffer monitor 32 monitors a number of packets stored in the send buffers 25~28 and notifies the result of monitoring to the control part 39 through the CONT BUSA. The buffer pointer 31 designates one buffer in which the packet to be read next is stored. The selection and control part 52 decodes the send packet indication signal input from the control part 39 through the CONT BUSA and a designated value of buffer pointer 31 to control the connection between the buffers 25~28 and send data buses S1~S4 by setting the switch 24 and gives the readout instruction to the buffer in which the packets to be sent are stored. Receive interface 41 (FIG. 6):

Structure of receive interface 41 is similar to the send interface 42 illustrated in FIG. 5 and therefore only the difference is explained hereunder.

Figure 7:
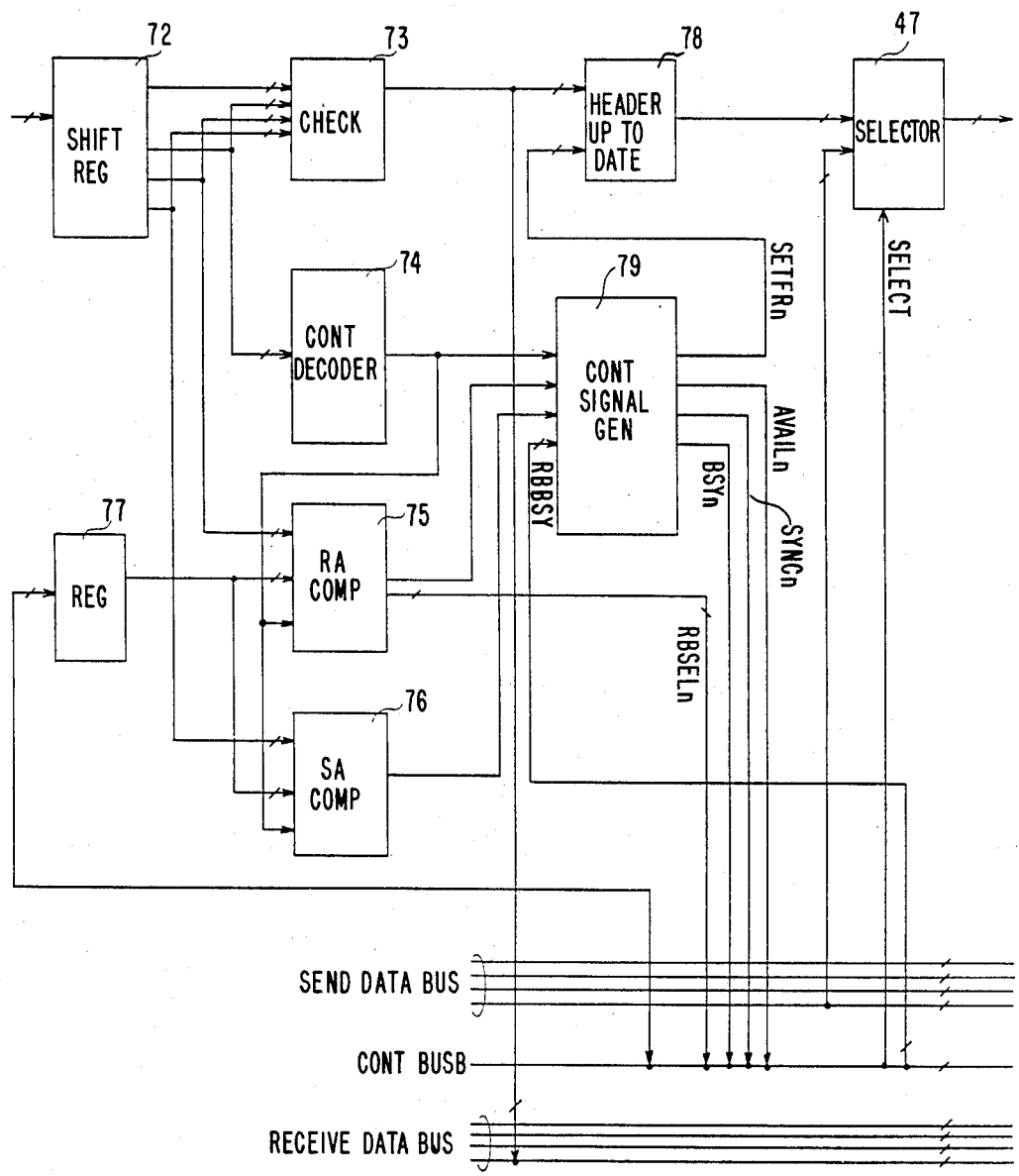
FIG. 7 shows a block diagram of a packet processing circuit.

The input side of the receive buffers 25'~28' can be connected with any sub-transmission lines S1~S4 through the switch 24'. Moreover, the buffer monitor 32' monitors a number of packets stored in the receive buffers 25'~28'. The buffer pointer 31' designates the buffer for storing the packets to be received next. A selection and control circuit 63 decodes the receive packet indication signal sent from the control part 39 and based on the content of buffer pointer 31, makes switching control of the switch 24 and the sends the write indication signal to the buffer to which the received packets are stored. As in the case of write address counter 59 indicated in FIG. 5, the read address counter 71 sequentially designates the buffers to read the packets like the receive buffers 25', 26', 27', 28', 25', ... 27', 28'. In the above explanation, four send/receive buffers are provided for four parallel transmission lines S1, S2, S3, S4, but it is not always required that the number of parallel transmission lines corresponds to the number of buffers on a one-to-one basis. Since switches 24, 24' are provided between the transmission lines and buffers, each buffer can be connected to any of the transmission lines S1~S4. Packet processing circuits 35, 36, 37, 38 (FIG. 7):

FIG. 7 indicates the structure of the packet processing circuit. Since the packet processing circuits are the same, the structure of only one circuit is indicated. The timing signal which is sent to each part for deciding the bit positions in a received packet from the frame synchronization circuit 34 is here eliminated for simplification of the figure.

The packets on the slots SLOT1~SLOT 4 (FIG. 3) of the transmission lines S1~S4 are input to a shift register 72. The shift register 72 is driven by the timing signal synchronized with the recieved packets and when these packets are all input, contents of control field CTL are input to control field decoder 74, contents of receive address field RA are input to receive address comparison circuit 75, and contents of send address field SA are input to the send address comparison circuit 76. The address of the local interface node 2 and the address of each terminal to be accommodated by the local interface node 2 are previously set in register 77 by MP4 43 through the CONT BUSB.

The control field decoder 74 displays the condition of received packets in accordance with the following table by decoding the contents of the control field CTL.

| | 0 | 1 |
|---|---|---|
| AV (valid/invalid indication flag) | unused packet unreserved packet | Packet being used reserved synchronous continuous packet |
| CM1 (reservation indication flag) | | |
| CM2 (burst communication indication flag) | | Burst communication packet |
| PS (packet receiving condition indication flag) | | Receive buffer busy (not receiveed) |
| ER (AV elimination node indication flag) | elimination of receive station | elimination of send station |

The receive address comparison circuit 75 compares the address of the RA field in the received packet with the address set in the register 77, detects whether or not the received packet is destined for the local interface node with reference to the output of the control field decoder 74 and also detects the terminal address being accommodated in the local interface node. When the receive addresses have matched, the receive address match signal RBSELn is sent together with the terminal address.

The send address comparison circuit 76 compares the address of the SA field in the received packet with the address set in the register 77 and detects whether or not the packet is transmitted from the local interface node with reference to the output of the control field decoder 74.

All bits of received packets are input to the check circuit 73 and a parity check is carried out.

The control signal generating circuit 79 generates the following control signals in accordance with the decoding result of control field decoder 74, the comparison result of the receive address comparison circuit 75, the comparison result of the send address comparison circuit 76 and the receive buffer busy signal from the control circuit 39 (RBBSYn). The slot number dealt with in the packet processing circuit is n.

① Received slot available (AVAILn)

When the slot is unused, the packet to the local interface node is received without error and the AV flag can be deleted in the receive station.

When the packet sent from the local node is received after circulation (when end of reception of each node is decided at the local station during communication to a plurality of nodes)

② Setting of each flag control field CTL (SETFRn)

③ Indication of synchronous continuous slot (SYNCn)

④ Remote station receive buffer busy (BSYn)

The packets sent from the local node are not received due to the remote station receive busy state.

The SETFRn among above signals is input to the packet header removal circuit 78 to set the valid/invalid indication flag AV in the control field CTL of the header of the receive packet to be input in the same way and reservation indication bit CM1.

With the SELECT signal from the control circuit 39, the switching control of the selection circuit 47 is carried out so that the packet from the header renewal circuit 78 is allowed to pass through the selection circuit 74 or the data from the header renewal circuit 78 is used only for the control field of the header and the packets on the send data bus are output for the other parts of the interface node 2, and thereby the packets are output to the transmission lines S1~S4. Control circuit CONT 39 (FIG. 8):

Since the control circuit CONT 39 is provided in common for the packet processing circuits 35~38 and a plurality of terminal interfaces 40, a plurality of control signals are also used to/from respective portions. But in FIG. 8, the control signals are simplified. The receivable packets are input to the receive packet control circuit 80 from the buffer monitor 32' of each receive interface 41 through CONT BUSA and the receive address coincidence signal RBSELn (including terminal address) is also input thereto from the packet processing circuits. Receive packet control circuit 80 refers to the control signals which are input and judges whether these can be received or not. When these are receivable, the slot number based on RBSELn is informed to the terminal interface 40 based on the receive address. If there is a receive buffer shortage, the receive buffer busy signal (RBBSY) is issued to the corresponding packet processing circuit.

A terminal send request analysis circuit 82 reads the register 61 within each send interface 42 with a constant period. The communication mode and a number of requested slots are set to the register 61. Therefore, the terminal send request analysis circuit 82 inputs a number of send requests and a number of requested slots of synchronous continuous communication to synchronous continuous communication management circuit 83 and moreover a number of send requests and a number of requested slots of burst communication to burst communication management circuit 85.

Allocated slot management circuit 81 is provided with a table for storing the frame counter given to each terminal interface for the synchronous continuous communication and the slot numbers (SLOT1, ... SLOT4) in the frame. When the frame header is input to the frame synchronizing circuit 34, the frame synchronizing circuit 34 detects the frame counter and the frame is input to the allocated slot management circuit 81. With this frame counter used as the address, the allocated slot management circuit 81 reads that the j-th slot is allocated to the k-th terminal interface from the table and notifies the synchronous continuous communication management circuit 83.

Renewal of table content (renewal of allocated frame, slot information) is executed by MPU 43 through CONT BUSA and MPU43 reads table content and confirms the allocated frame and slot information.

The synchronous continuous communication management circuit 43 generates the send select signal for the synchronous continuous communication from the inputs sent from the terminal send request analysis circuit 82 and allocated slot management circuit 81 and AVAILn and SYNCn from the packet processing circuits 35 38.

Namely, when AVAILn and SYNCn are input from the packet processing circuit corresponding to the n-th slot, the allocated slot number and receive slot match and are available, indicating that the terminal which has reserved the slot n in the table can be used for the synchronous continuous communication. Therefore the send select signal is transmitted to the terminal interface 40 which accommodates the reserved terminal. This send select signal is input to the select control circuit 52 of the send interface through the CONT BUSA.

The burst communication management circuit 85 sets the terminal interfaces with priority 1~m for bust communication depending on the information sent from the terminal send request analysis circuit 82 and inputs the burst data to burst data selection control circuit 86.

The available slot analysis circuit 84 judges how many slots are available for the burst communication from the AVAILn and SYNCn signals and then inputs the signals to the burst data selection control circuit 86.

Namely, when only AVAILn is input (SYNCn is not input), the n-th slot is not reserved and it can be allocated for the burst communication.

The burst data selection and control circuit 86 allocates the available slots sequentially from the terminal interface 40 having the highest order depending on the determined priority sequence and then outputs the send select signal for the burst communication. The select signals for synchronous continuous communication and burst communication are input to send packet control circuit 88 and the send select signal for controlling the selection circuit 47 in the packet processing circuit and the send select signal input to the selection control circuit 52 in the send interface are output.

A register 87 holds the terminal interface of the lowest priority among the terminal interfaces to which the slots are allocated in the burst data selection and control circuit 86 and then determines the terminal interface with highest priority in the next frame.

Figure 9:
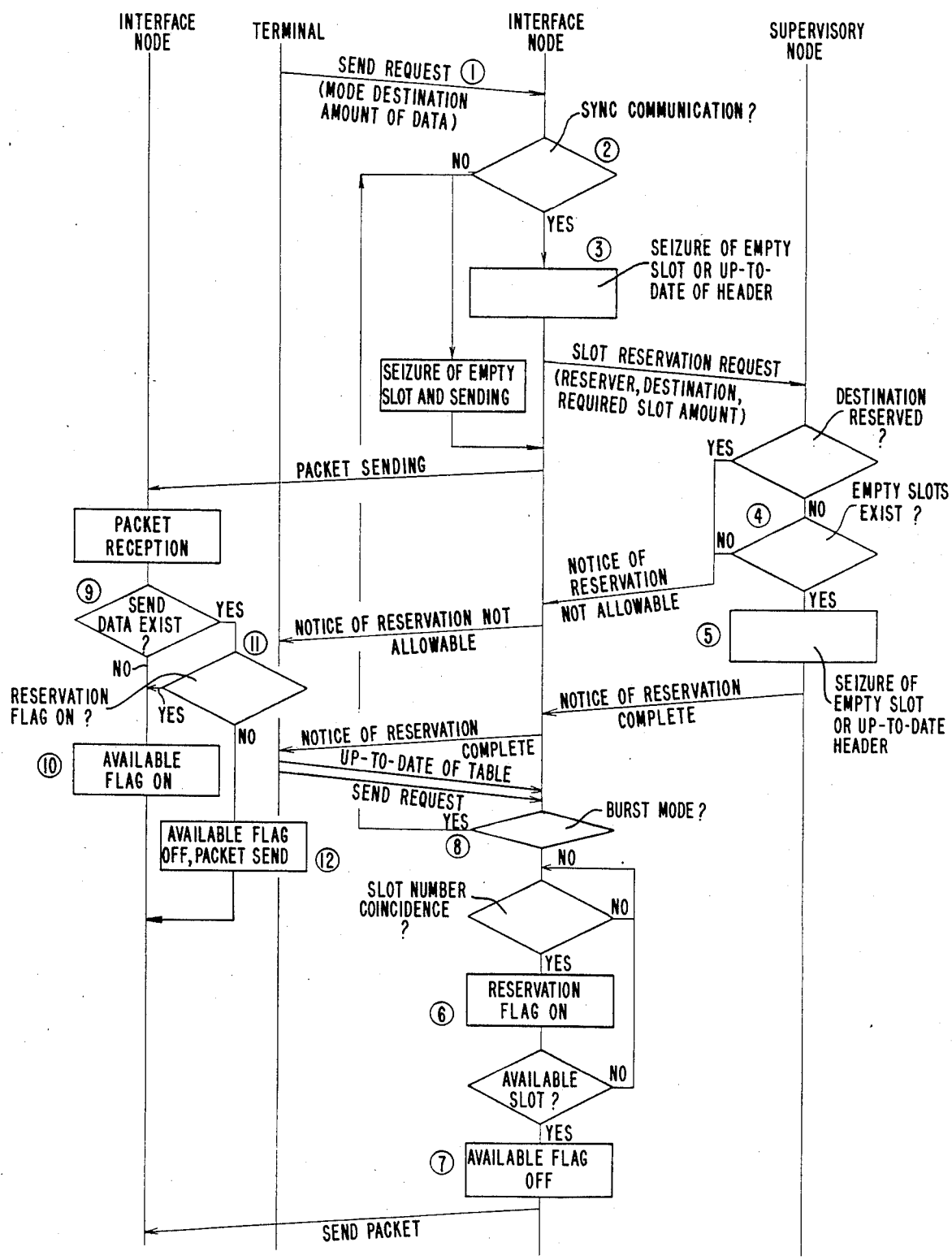
FIG. 9 shows a packet sending/receiving sequence of a system of the present invention.
Figure 10A:
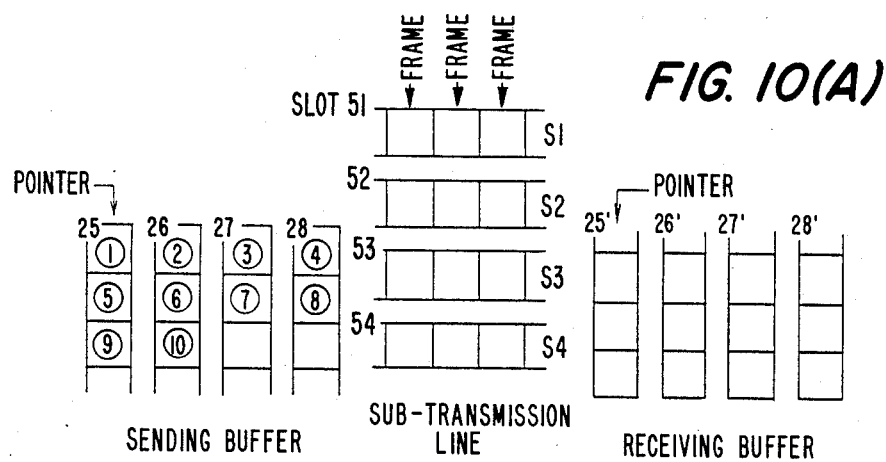
Figure 10B:
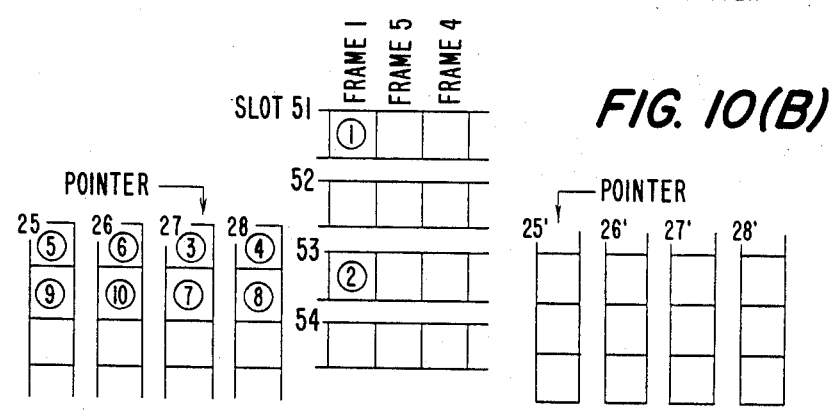
Figure 10C:
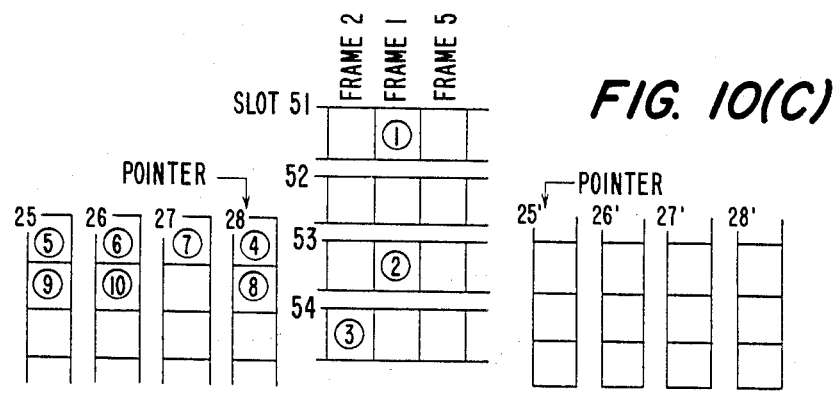

Respective circuits have been explained previously in detail and the packet send sequence will now be explained with reference to FIG. 9.

① For the reservation for synchronous continuous communication by the terminal accommodated by the terminal interface 40, the send mode (the mode is the same as burst communication in the case of reservation), receive address and a number of packets required for transmission are set first to the register 61.

② The send data is input to the packet assembling circuit 29 in order to form a packet and it is then stored in the send buffers 25~28. In this case, the receive address RA in the packet header is the supervisor node and moreover the receive address and the number of packets actually required and data which indicates a reservation request for synchronous continuous communication exist within the information region of the packet.

Figure 8:
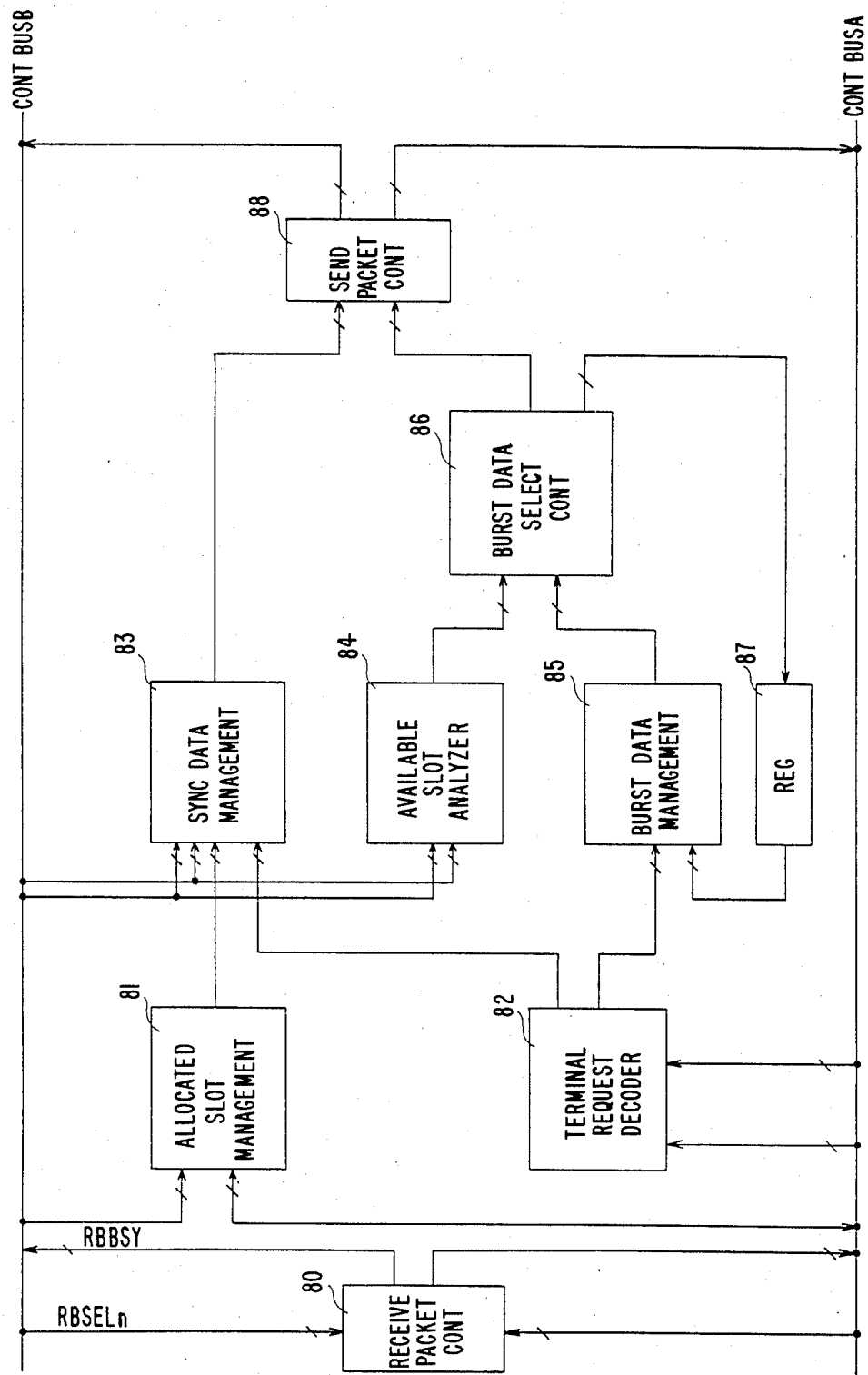
FIG. 8 shows a block diagram of a control circuit.

③ The control circuit 39 recognizes the send mode. Because of the burst communication, the priority sequence explained for FIG. 8 is used for the relevant terminal interface 40. The specified empty slot is seized depending on such priority sequence and the packet in the send buffer is received by the supervisor node 3.

④ The supervisor node 3 is also provided with the structure illustrated in FIG. 4 like the other interface nodes and the allocated slot management circuit 81 of the control circuit 39 is also provided with tables for all nodes. In addition, an MPU is accommodated in the terminal interface 40 within the supervisor node 3. Therefore, information of a packet destined to the local node is notified to MPU through the terminal interface 40. MPU makes reference to the table of allocated slot management circuit 81 of the control circuit 39 and checks whether the actual party for communication of the relevant terminal has already reserved the packet or not. When the communication party has not yet reserved the packet, leaving the requested number of packets unreserved, the table is renewed, the relevant terminal is reserved and registered, end of reservation is notified to the relevant terminal with the ordinary burst communication and the packet number allocated by reservation, frame number and slot number are also notified. When the other party has already reserved the packet or the reserved number of packets are not available, a reservation disable signal is sent to the relevant terminal.

⑤ The relevant terminal which has received the end of reservation requests renewal of table by MPU. The slot number and relevant terminal address are stored to the table with the allocated frame number used as the address.

⑥ Data is set to the register 61 depending on the synchronous continuous communication request of the relevant terminal. Upon decision of synchronous continuous communication, the control circuit 39 turns on the reservation indication flag of the packet header of the packet of a slot number after the relevant terminal address and such slot number is read from the table with the frame number used as the address. The control circuit waits until the valid/invalid indication flag of a current packet indicates the invalid condition.

⑦ When it is detected that the valid/invalid indication flag indicates the invalid condition, the packet stored in the send buffer is transmitted. In this case, the header is updated so that the valid/invalid indication flag indicates the valid condition.

⑧ In the case of ordinary burst communication which does not set the reservation flag, the packet is sent with the receive address considered as the ordinary terminal as in the case of step ③.

⑨ The interface node which has received this packet sends this packet to the receive terminal and checks whether there are send data from a terminal in the local node.

⑩ In case there is no send data, the valid/invalid indication flag indicates the invalid condition and the received packet is directly sent.

⑪ In case there is send data, it is checked whether such send data is reserved or not. In case this data is reserved, processing the same as in step ⑩ is carried out.

⑫ In case such send data is not reserved, the valid/invalid indication flag of received packet indicates the valid condition and data is transmitted.

According to the above method, in order to perform the communication between the interface node 2 and the supervisory node 3 for sending the request of reserving the slots from the interface node 2 or for informing the interface node 2 the allowance of reservation and the reserved slot number from the supervisory node 3, it is necessary to access the empty slots so that it is required to wait until the empty slots are indicated.

So, as described with FIG. 3, it is efficient to use a field in the frame header. Namely, a field is allocated to the interface nodes 2 and the supervisory node 3 for the management of the network, so that this field is not used for all of the slots.

Then, describing the structure to perform the above method with reference to FIG. 4, O/E converter 30 outputs the frame of FIG. 3 to the frame header processor 48. The frame header processor 48 is driven by the timing signals from the frame synchronizing circuit 34 and receives the of command field of the frame header at the shift register REG1. The contents of the command field are decoded in the frame header processing 48 and the decoded signal is output to the control circuit 39 via CONT BUSB.

When the request of reservation of the slots are sent to the control circuit 39, the control circuit 39 gates the output corresponding to the command field from the shift register REG1 and, in response to the gating output from the shift register REG1, control circuit 39 sets the command for reservation in the shift register REG2. Then, the shift register REG2 outputs the up-to-date frame header in series to the switch 50 in accordance with the timing signal from the frame synchronizing circuit 34.

At this time, switch 50 selects the output of the frame header processor 48.

After output from the frame header processor 48 ends, the switch 50 immediatly selects the output from P/S converter 22 so that the frame header is added to the packet header and the frame is completly reconstructed.

What is claimed is:

1. A packet data communication system, comprising:
   a ring-type transmission line for circulating frames, each frame including a frame header and a predetermined number of slots in which packets to be transmitted are loaded, the slots having a predetermined order of priority; and
   a plurality of interface nodes, provided on said ring-type transmission line, for loading the packets in the slots and for receiving the packets from the slots, each of said interface nodes including
   a predetermined number of sub-transmission lines for passing each of the slots in one of the frames in parallel through said interface node,
   terminal interfaces, each having a plurality of sending buffers for sequentially storing the packets to be transmitted in a transmission sequence using different ones of the sending buffers for adjacent packets and a plurality of receiving buffers for storing the packets to be received,
   packet processing means for detecting whether the slots on any of said sub-transmission lines are available and for detecting the addresses of the packets in unavailable slots,
   synchronization means for synchronizing the frames using information in the frame header and for supplying a plurality of timing signals to said packet processing means,
   switch means for connecting each of the sending buffers and the receiving buffers to any one of said sub-transmission lines, said packet processing means controlling said switch means to connect the sending buffer containing a next packet, as determined by the transmission order, to a transmissible one of said sub-transmission lines selected in the predetermined order of priority and containing an available slot, whereby a group of the packets forming a message may be transmitted simultaneously from a single interface node, while maintaining the transmission sequence of the group of the packets.

2. A packet data communication system as set forth in claim 1,
   wherein each of the slots has a packet information area and a packet header area including a control field for indicating condition of the slots and address fields for indicating packet send terminals and packet receive terminals, and
   wherein said packet processing means analyzes the packet header area.

3. A packet data communication system as set forth in claim 2, wherein said control field in each of the slots includes
   a first flag for indicating whether the respective slot is available, and
   a second flag for indicating whether the respective slot is reserved for synchronous continuous communication.

4. A packet data communication system as set forth in claim 3, wherein said packet data communication system transmits data between terminals operatively connected to said interface nodes,
   wherein said packet processing means in each of said interface nodes includes
   a control field analyzer for decoding the control field to produce a control field signal, and
   an address field analyzer for determining whether a received packet is addressed to one of the terminals operatively connected to the respective interface node and for producing an address signal, and
   wherein said packet data communication system further comprises control means for controlling said packet processing means and said terminal interfaces, having an interface table for memorizing numbers of reserved slots for the terminals operatively connected to the respective interface node and a terminal request decoder for detecting which of the terminals request transmission of packets and whether synchronous continuous communication is requested, and for controlling said switch means in accordance with the control field signal from said control field analyzer and the address field from said address analyzer field.

5. A packet data communication system as set forth in claim 4, wherein said packet processing means includes up-to-date means for rewriting the first and second flags of the control field in accordance with the control field signal from said control field analyzer, said address field analyzer and said control means.

6. A packet data communication system as set forth in claim 5, wherein, when said control means detects that synchronous continuous communication is requested from a requesting terminal and that the available slot in the transmissible one of said sub-transmission lines is reserved for the requesting terminal with reference to the interface table, then said control means controls said switch means to connect the sending buffer containing data from the requesting terminal to the transmissible one of said sub-transmission lines.

7. A packet data communication system as set forth in claim 5, wherein, when said control means detects that synchronous continuous communication is requested from a requesting terminal and that either the slots on said sub-transmission lines are reserved for the requesting terminal, but unavailable, or a received packet is addressed to one of the terminals operatively connected to the respective interface node, then said control means controls said up-to-date means to set the second flag of one of the slots to indicate reservation for the requesting terminal.

8. A packet data communication system as set forth in claim 5,
   wherein each of the receiving buffers have a packet receiving order, and
   wherein, when said address field analyzer determines that a received packet is addressed to one of the terminals operatively connected to the respective interface node, said control means controls said switch means to connect said sub-transmission lines to supply the slots in the predetermined order of priority to the receiving buffers in dependence upon the packet receiving order.

9. A packet data communication system as set forth in claim 8, wherein, when said terminal request decoder does not detect a request to send packets from any of the terminals operatively connected to the respective interface node, said control means controls said up-to-date means to set the first flag in the slots to indicate that the respective slot is available.

10. A packet data communication system as set forth in claim 8, wherein, when said terminal request decoder detects a request to send packets from one of the terminals operatively connected to the respective interface node, said control means controls said up-to-date means to set the first flag in the slots to indicate that the respective slot is unavailable and controls said switch means to connect the sending buffers to said sub-transmission lines.

11. A packet data communication system as set forth in claim 4, further comprising a supervisor node, provided on said ring-type transmission line, for supervising the packet header area of each of the slots to detect condition of each of the slots, for recording the condition in a supervisory table and for managing non-reserved slots using the supervisory table to allow each of said interface nodes to reserve the non-reserved slots.

12. A packet data communication system as set forth in claim 11,
   wherein said interface nodes send the packets indicating requests for reservation of a number of necessary slots corresponding to an amount of synchronous continuous communication data and a number of the terminals addressed, and
   wherein said supervisor node, upon receipt of the packets indicating the requests for reservation, checks the contents of the packets with reference to the supervisory table, allocates some of the non-reserved slots to said interface nodes requesting reservation and informs said interface nodes requesting reservation reserved slot numbers using the packets.

13. A packet data communication system as set forth in claim 12, wherein, when said interface nodes receive the packets from said supervisor node, said control means stores the reserved slot numbers in the interface table.

14. A packet data communication system as set forth in claim 13, wherein communication between said interface nodes and said supervisor node is performed using the address field and the packet information area of the slots.

15. A packet data communication system as set forth in claim 13, wherein said frame header includes a command area for communicating between said interface nodes and said supervisor node.

16. A packet data communication system as set forth in claim 1,
   wherein each of the receiving buffers have a packet receiving order, and
   wherein said packet processing means controls said switch means to connect a receivable one of the sub-transmission lines, selected in the predetermined order of priority and containing one of the packets to be received, to an available receiving buffer selected in dependence upon the packet receiving order.

* * * * *